United States Patent
Kamath

(10) Patent No.: US 6,614,647 B2
(45) Date of Patent: Sep. 2, 2003

(54) LOW IMPEDANCE ELECTROCHEMICAL CELL

(75) Inventor: Hundi P. Kamath, Los Altos, CA (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 10/140,006

(22) Filed: May 6, 2002

(65) Prior Publication Data

US 2002/0163772 A1 Nov. 7, 2002

Related U.S. Application Data

(60) Provisional application No. 60/289,543, filed on May 7, 2001.

(51) Int. Cl.[7] ................................................. H01G 9/00
(52) U.S. Cl. ....................................... 361/502; 361/503
(58) Field of Search .............................. 361/502, 503, 361/508–520, 535–540

(56) References Cited

U.S. PATENT DOCUMENTS

| | | | | |
|---|---|---|---|---|
| 4,408,259 A | * | 10/1983 | Muranaka et al. ........... | 361/434 |
| 4,713,731 A | | 12/1987 | Boos et al. .................. | 361/433 |
| 4,992,910 A | * | 2/1991 | Evans ......................... | 361/502 |
| 5,260,855 A | * | 11/1993 | Kaschmitter et al. ........ | 361/502 |
| 5,383,089 A | * | 1/1995 | Williams et al. ............. | 361/502 |
| 6,252,762 B1 | | 6/2001 | Amatucci .................... | 361/503 |

* cited by examiner

Primary Examiner—Dean A. Reichard
Assistant Examiner—Eric Thomas
(74) Attorney, Agent, or Firm—Beyer Weaver & Thomas LLP

(57) ABSTRACT

Provided are electrochemical (e.g., double layer capacitor) cell designs and methods of their manufacture, which reduce cell impedance and increase volumetric capacitance while maintaining inter-electrode dielectric integrity and cell performance. The designs eliminate the contiguous separator material used as the dielectric between the electrodes in conventional double layer capacitor cells. The separator is replaced by a noncontiguous array of dielectric particles, such as glass beads or fibers, sized and distributed to provide substantially uniform separation between the electrodes. The remaining space between the electrodes unoccupied by the dielectric particles is filled with electrolyte. In this way, a much greater proportion of the dielectric space between the electrodes is available for ionic transport. Glass beads and fibers are available with diameters less than that available for currently-used separator materials. Thus, the distance between the electrodes may be reduced without compromising dielectric integrity. The result is a lower impedance, higher volumetric capacitance double layer capacitor cell.

20 Claims, 4 Drawing Sheets

LOW IMPEDANCE ELECTROCHEMICAL CELL

CROSS-REFERENCE TO RELATED APPLICATIONS

This application claims priority from U.S. Provisional Application No. 60/289,543 entitled Low IMPEDANCE DOUBLE LAYER CAPACITOR CELL, filed May 7, 2001, the disclosure of which is incorporated by reference herein for all purposes.

BACKGROUND OF THE INVENTION

1. Field of the Invention

The present invention relates to electrochemical cells and methods for their manufacture. More particularly, the invention relates to separator-less double layer capacitor cells having improved performance characteristics including decreased impedance.

2. Description of Related Art

Unlike a battery, a capacitor does not produce electrons by chemical reaction. However, capacitors, have a distinct advantage over batteries in certain applications in that that they can be recharged incrementally and quickly. Thus, capacitors are advantageously used in hybrid systems in conjunction with batteries to support brief high current demands through pulse discharges. Also, they may be used for power storage and as stand-alone power back-ups, for example, to provide a stable power source for computer memory in the event of a primary power source failure.

There are two principal types of capacitors: Parallel plate, and double layer. A parallel plate capacitor is composed of two electrically conductive (typically metal) plates (electrodes) separated by a dielectric. A difference in charge on the two electrodes is maintained by the dielectric between them giving rise to capacitance.

Double layer capacitors include at least one inert, high surface-area electrode and an electrolyte. Their capacitance arises from a separation of charged species at the electrolyte-electrode interface (i.e., the "double layer"). Typically the charge separation distance is on the order of atomic dimensions. The capacitors are often referred to as "supercapacitors" because of their potentially enormous capacitance (possibly as high as farads or tens of farads per gram). This high capacitance results from a combination of the very small charge separation distance inherent in double layers coupled with a particularly high surface area of the electrodes (often on the order of thousands of meters squared per gram).

A typical double layer capacitor cell contains two electrodes separated by a dielectric (typically an electrode separator) to maintain electrical isolation between the electrodes. These double layer capacitors are charged by applying a voltage across the two electrodes and thereby increasing the total charge stored in the double layer of each electrode. The voltage difference across the two electrodes can continue to increase during charge so long as the leakage current between the electrodes remains low. Ultimately, however, the potential difference between the two electrodes will reach a level where the electrolyte solvent is electrolyzed (introducing a large source of leakage current). Generally, electrolysis of the electrolyte is to be avoided in double layer capacitors because it can cause, among other detrimental effects, loss of electrolyte, increased pressure in the cell, and formation of explosive mixtures (oxygen and hydrogen in the case of aqueous electrolytes).

Conventional double layer capacitor devices are typically packaged in a metal container. FIGS. 1A and 1B illustrate simplified examples of such packages:

FIG. 1A shows a conventional double layer capacitor device package of a metal can with protruding leads. The capacitor 100 is composed of a pair of electrodes 102, 104 separated by a separator material 106 and wound into a roll 109. The separator 106 is typically a porous electrically insulting material, such as polyethylene. An electrolyte is also present between the two electrodes, typically permeating the separator. The purpose of the electrolyte in a double layer capacitor is to provide ion transport between the electrodes. Electrolytes for this purpose may be aqueous or organic. Suitable aqueous electrolytes include dilute acids and alkaline solutions such as 30% sulfuric acid or 40% potassium hydroxide. Suitable organic electrolytes include quarternary ammonium salts dissolved in a solvent such as propylene or ethylene carbonate. The capacitor components are contained in a metal, typically aluminum or steel, can 108. Leads 110 connected to the two electrodes 102, 104 protrude from the can 108 for external electrical connection.

FIG. 1B shows a conventional double layer capacitor device package of a coin cell. The capacitor 120 is again composed of a pair of electrodes 122, 124, in this case disks, separated by a separator material 126. The separator 126 is typically a porous electrically insulting material, such as polyethylene. An electrolyte is also present between the two electrodes, typically permeating the separator. The capacitor components are contained in a metal, typically aluminum or steel, package 128 composed of a case 130 and a cap 132. In this package, rather than protruding leads, where the metal package itself acts as a lead for external electrical connection.

Conventional separator materials for these electrochemical devices are paper, porous polymer (e.g., polyethylene) materials, and glass fiber mats. These materials have typical minimal thicknesses of about 30–80 microns, 9 to 25 microns, and 200 microns, respectively. The porosity of paper and polymer separators is typically about 30–50% and that of glass fiber may be as much as 80%. These conventional separator materials also each have an element of "tortuosity," that is, the degree to which the pores (or other paths through the materials) depart from a straight line. The greater the tortuosity of a porous material, the more the paths, on average, depart from a straight line, and the more resistance there is to passage of electrolyte, salts and ions through the separator material.

In a multi-electrode double layer capacitor cell, the migration of ions in the electrolyte from one electrode interface to the other occurs during charging and discharging of the device. Efficient ionic transport means lower impedance resulting in faster charge and higher power delivery. The less efficient the ionic transport through the separator, the higher the impedance of the device. Also, cell impedance is affected by the distance between the electrodes. The greater the distance between the electrodes, the less efficient the ionic transport and the greater the impedance of the cell. Further, decreasing the distance between the electrodes in a multi-electrode double layer capacitor cell would allow for the incorporation of more active material (i.e., carbon) in a given cell volume so that the volumetric capacitance (e.g., farads (F)/cc) might be increased beyond the 1 to 5 F/cc of state of the art commercial products.

Accordingly, in order to produce lower impedance double layer capacitor cells and to increase volumetric capacitance, it would be desirable to reduce the distance between electrodes in double layer capacitors and to increase the proportion of the area between the electrodes available for ionic transport.

SUMMARY OF THE INVENTION

The present invention addresses this need by providing electrochemical (e.g., double layer capacitor) cell designs and methods of their manufacture, which reduce cell impedance and increase volumetric capacitance while maintaining inter-electrode dielectric integrity and cell performance. The designs eliminate the contiguous separator material used as the dielectric between the electrodes in conventional double layer capacitor cells. The separator is replaced by a noncontiguous array of dielectric particles, such as glass beads or fibers, sized and distributed to provide substantially uniform separation between the electrodes. The remaining space between the electrodes unoccupied by the dielectric particles is filled with electrolyte. In this way, a much greater proportion of the dielectric space between the electrodes is available for ionic transport. Glass beads and fibers are available with diameters less than that available for currently-used separator materials. Thus, the distance between the electrodes may be reduced without compromising dielectric integrity. The result is a lower impedance, higher volumetric capacitance double layer capacitor cell.

In one aspect, the invention pertains to an electrochemical cell. The cell a cell container, first and second electrodes provided within the cell container, a noncontiguous dielectric provided within the cell container and disposed between the electrodes, and an electrolyte provided within the cell container. The cell may be a double layer capacitor cell.

In another aspect, the invention pertains to an electrochemical structure. The structure includes first and second carbon aerogel electrodes, and a noncontiguous dielectric disposed between the electrodes.

In another aspect, the invention pertains to a method of making an electrochemical cell. The method involves forming a noncontiguous layer of dielectric particles between first and second electrodes, placing the electrodes in a cell container, providing an electrolyte in the cell container, laminating the electrode and dielectric layers, and sealing said cell.

These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides electrochemical (e.g., double layer capacitor) cell designs and methods of their manufacture, which reduce cell impedance and increase volumetric capacitance while maintaining inter-electrode dielectric integrity and cell performance. The designs eliminate the contiguous separator material used as the dielectric between the electrodes in conventional double layer capacitor cells. The separator is replaced by a noncontiguous dielectric, being an array of dielectric particles, such as glass beads or fibers, sized and distributed to provide substantially uniform separation between the electrodes. The component dielectric particles of the noncontiguous dielectric may or may not be in direct contact with other dielectric particles of the noncontiguous dielectric. The remaining space between the electrodes unoccupied by the dielectric particles of the noncontiguous dielectric is filled with electrolyte. In this way, a much greater proportion of the dielectric space between the electrodes is available for ionic transport. Glass beads and fibers are available with diameters less than that available for currently-used separator materials. Thus, the distance between the electrodes may be reduced without compromising dielectric integrity. The result is a lower impedance, higher volumetric capacitance double layer capacitor cell.

Figure 1A:
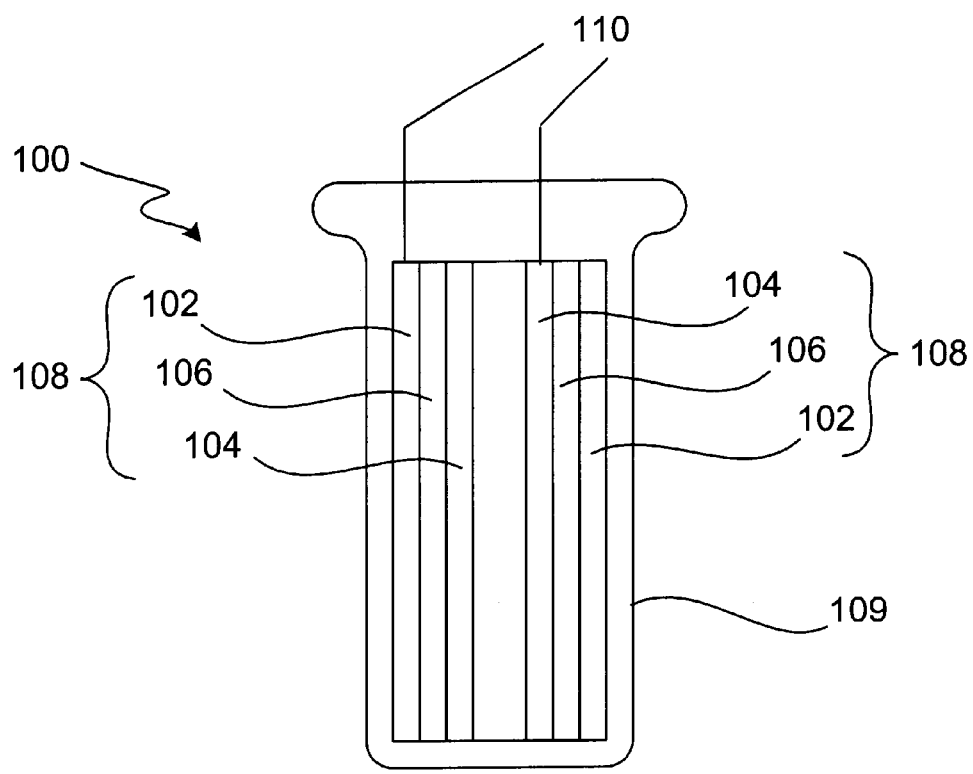
FIGS. 1A and 1B depict cross-sectional views of conventional double layer capacitor package designs.
Figure 1B:
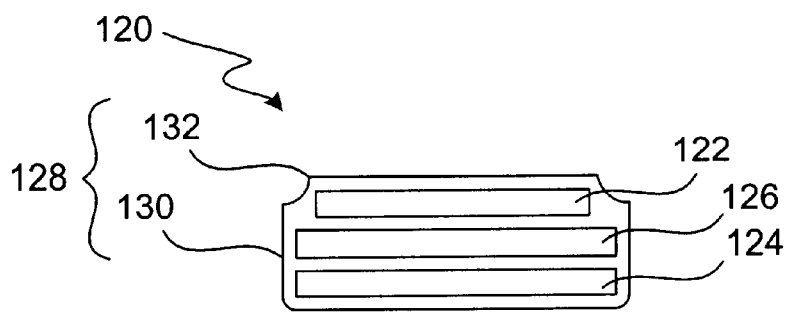
Figure 2:
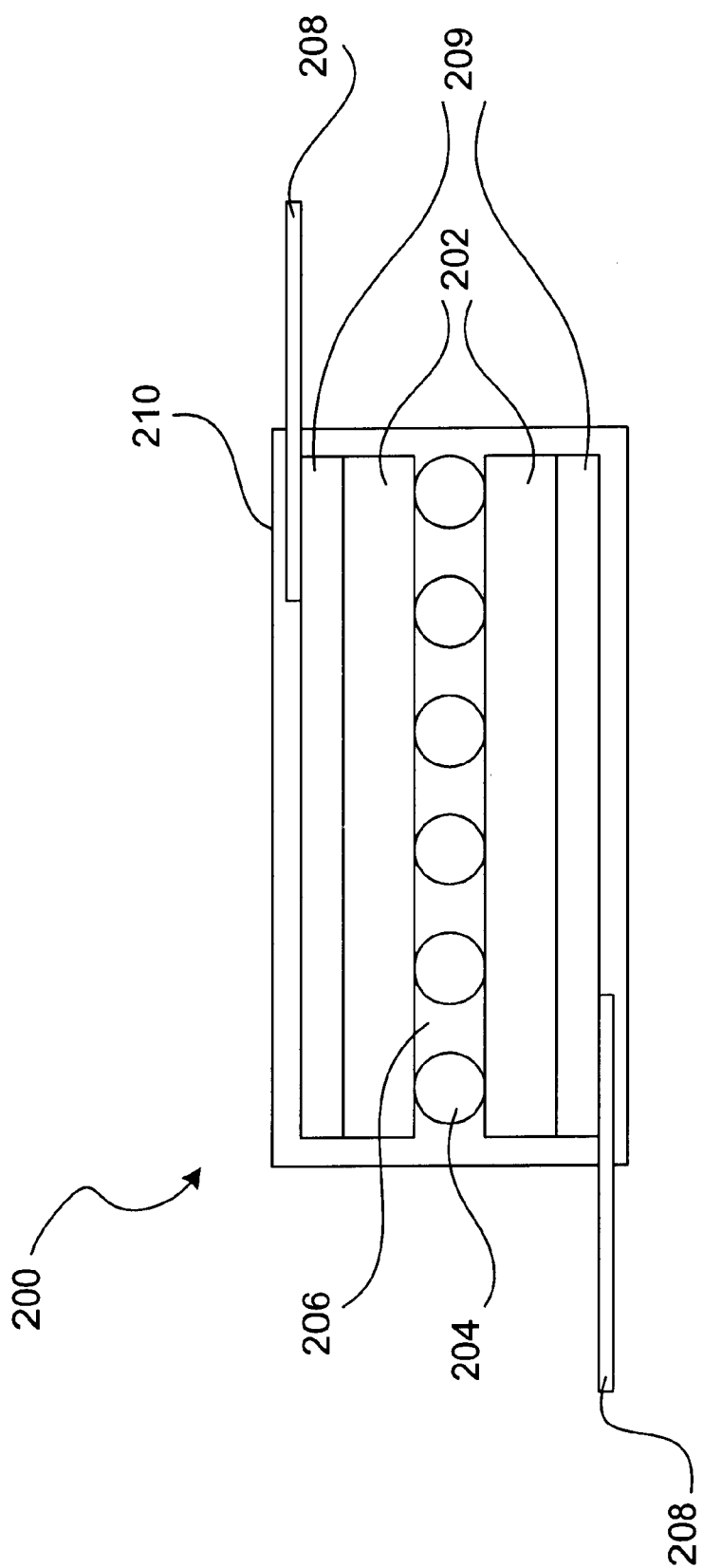
FIG. 2 depicts a cross-sectional view of a double layer capacitor cell in accordance with one embodiment of the present invention.

FIG. 2 shows a cross-sectional view of a preferred embodiment of the present invention in which a double layer capacitor cell is provided in a package. The cell 200 is composed of two electrodes 202. The electrodes 202 preferably, but not necessarily, have the same composition. The electrodes may be made from any high surface area, inert, and conductive material. Preferably, however, the electrodes are made from a high surface-area carbon-based material such as activated carbon composites, carbon fiber cloths, carbon power with binders, or carbon fiber cloths with metal fibers. In general, any carbon-based electrode can be "activated" by, for example, controlled oxidation to increase the surface area. Activation techniques are discussed in, for example, U.S. Pat. No. 4,713,731 to Boos et al. which is incorporated herein by reference for all purposes. In addition to carbon-based electrodes, ruthenium oxide ($RuO_2$) based composites (and other electrode materials commonly used in double layer capacitors) may be suitable electrode materials for the present invention.

In particularly preferred embodiments, the electrodes are made from carbon aerogel foams. Such foams have been found to exhibit superior characteristics such as low resistance and high specific capacitance when used in double layer capacitors. Carbon aerogel capacitors and their manufacture are described in U.S. Pat. No. 5,260,855 issued to Kaschmitter et al. and incorporated herein by reference for all purposes. Various modifications of a basic carbon aerogel structure are within the scope of this invention.

In general, carbon aerogels suitable for use with this invention can be made according to the following procedure. First, specified reactants are mixed with a catalyst and may include the addition of metals. The reactants include resorcinol (1,3-dihydroxybenzene), phenol, catechol, phloroglucinol, or other hydroxybenzene compounds that react in the appropriate ratio with aldehydes (e.g., formaldehyde or furfural). Preferred combinations include resorcinol-formaldehyde, phenol-resorcinol-formaldehyde, resorcinol-formaldehyde, catechol-formaldehyde, and phloroglucinol-formaldehyde. An aquagel which is formed by polymerization is then dried in solvent exchange and extraction steps as is known in the art. The resulting organic aerogel is subsequently pyrolyzed in an inert atmosphere or vacuum to form a carbon aerogel. In alternative embodiments, the pyrolysis atmosphere includes small amounts of hydrogen or other appropriate material which at least partially reacts with the carbon surface.

The aquagels are formed through a sol-gel polymerization of multifunctional organic monomers (mentioned above) in a solvent, typically water, leading to the formation of highly cross-linked, transparent gels. For example, in a preferred embodiment, one mole of resorcinol (1,3-dihydroxybenzene) condenses in the presence of a basic catalyst with two moles of formaldehyde. Mildly basic catalysts such as sodium carbonate are preferred. In this polymerization, resorcinol is a trifunctional monomer capable of adding formaldehyde in the 2-, 4-, and/or 6-ring positions. The substituted resorcinol rings condense with each other to form nanometer-sized clusters in solution. Eventually, the clusters crosslink through their surface groups (e.g., —$CH_2OH$) to form an aquagel. A full discussion of the chemistry is not provided here since the specific details are described in depth in U.S. Pat. Nos. 4,997,804 and 4,873,218, which are incorporated herein by reference for all purposes.

The size of the clusters is regulated by the concentration of catalyst in the resorcinol-formaldehyde (RF) mixture. More specifically, the mole ratio of resorcinol (R) to catalyst (C), R/C, controls the surface area and electrochemical properties of the resulting gel. In gels having R/C of 100 and 200, it has been found that electrical conductivity increases significantly with increasing density.

After the aquagel is formed, it must be dried to form the aerogel. In some cases, when the polymerization solvent is removed from the gel by simple evaporation, large capillary forces are exerted on the pores, forming a collapsed structure known as a xerogel. In order to preserve the gel skeleton and minimize shrinkage (and thereby provide an aerogel as opposed to a xerogel), it may be necessary to perform the drying step under supercritical conditions. The details of a suitable supercritical drying procedure as well as other aspects of carbon aerogel preparation are provided in U.S. Pat. No. 5,260,855, previously incorporated by reference. In some embodiments, a xerogel or a composite xerogel/aerogel will be used to prepare the electrodes.

In other preferred embodiments, the aerogel structure is provided by simple drying. Specifically, in cases where the aerogels are of sufficiently high density, such as between about 0.4 and 1.2 g/cc, the pore network may have sufficient inherent strength to withstand the drying process without resort to supercritical drying conditions. In such procedures, a solvent such as acetone may be exchanged with water and then slowly evaporated in air to yield a dry aerogel monolith ready for pyrolysis. Such nonsupercritical drying is particularly attractive because of reduced processing time and cost. Following the solvent exchange/extraction step, the organic aerogel is typically pyrolyzed at elevated temperatures about 1050° C. in a vacuum or inert atmosphere of nitrogen, argon, neon or helium to form carbon aerogels. Choice of pyrolysis temperatures (600° C.–2100° C.) will effect the surface area and physical and chemical structure of the carbon aerogel.

While not wishing to be bound by theory, it is believed that carbon aerogel foams serve as superior double layer capacitor electrode materials because (1) they can be made into monolithic carbon structures having low electrical resistance, (2) their pore sizes can be controlled so that all or nearly all available surface area is wetted by the electrolyte, (3) they can be made to have a high surface area density, and (4) they can be provided as chemically pure carbon. In contrast, particulate carbons have higher internal resistances due to interparticle contact resistance and binder resistance. Further, such electrodes may have only a fraction of their available surface area effectively wetted because their pore size distribution extends into a regime where the pore size is on the order of the double layer (i.e., the pores are too small to be effectively wetted). In addition, at such small dimensions, the ionic resistance in the pores may significantly increase. Still further, surface roughness inherent to electrodes composed of particulates increases the likelihood of shorting of electrodes as dielectric thickness is decreased.

While it is sometimes preferred to employ a monolithic carbon aerogel as an electrode material (for the reasons described above), other forms of carbon aerogel are also suitable for some applications. These include (1) microsphere carbon aerogels formed by emulsion polymerization, and (2) crushed carbon aerogels. These materials may be provided with binders on a metallic substrate to form electrodes.

A particularly preferred electrode material for use in the present invention is monolithic carbon aerogel disks. These disks may be of any desired shape. Preferred embodiments include circular and rectangular disks about 5 to 100 mm, more preferably about 5 to 50 mm, in their largest dimension.

Unlike conventional cells, the cell 200 does not have an electrode separator 206 in the dielectric region between the individual electrodes. Instead, a noncontiguous array of dielectric particles 204, such as glass beads or fibers, is used to maintain electrical isolation between the electrodes. The dielectric particles are sized and distributed to provide substantially uniform separation between the electrodes. The remaining space between the electrodes unoccupied by the dielectric particles is filled with electrolyte. In this way, a much greater proportion of the dielectric space between the electrodes is available for ionic transport than is the case with conventional contiguous porous separator materials. Glass beads and fibers are available with diameters less than that available for currently-used separator materials. For example, glass beads suitable for use in double layer capacitor cells with diameters from about 3 to 9 microns are available from Nippon Electric Glass, Co. of Japan. More generally, dielectric particles with diameters as low as 1 micron or lower may be used as long as electrical isolation between the electrodes is maintained.

An electrolyte 206 is also provided in the dielectric region between the two electrodes 202. Suitable electrolytes for the present invention include aqueous electrolytes such as 40% KOH or 30% sulfuric acid, and non-aqueous electrolytes such as tetraethylammonium tetrafluoroborate ($Et_4N(BF_4)$) salt dissolved in an organic solvent such as propylene carbonate. Other suitable electrolyte compositions for double layer capacitor cells in accordance with the present invention, including solid and gel electrolytes, are known to those of skill in the art.

The electrodes in the cells of the present invention also preferably include or are supplemented by a current collector 209. The current collectors employed in this invention may generally be made from any of a number of different metals including aluminum, titanium, nickel, nickel alloys, etc. Aluminum (Al) is particularly preferred as it is lightweight, inexpensive, posses high electrical conductivity, and is chemically stable in organic electrolytes relative to other current collector materials. The metal current collectors 209 may take the form of disks, foil sheets or they may be spray deposited, for example, using the techniques described in U.S. patent application Ser. No. 09/611,040 entitled CARBON-BONDED METAL STRUCTURES AND METHODS OF FABRICATION, filed Jul. 6, 2000, the disclosure of which is incorporated by reference herein for all purposes. When used, they are positioned on the exterior surface of the electrodes.

Double layer capacitor cells having the having the components described above are packaged in a cell container 210. The container may be a rigid metal, preferably aluminum. More preferably, the cell container 210 may be composed of a foil "pouch." The foil pouch is substantially gas-impermeable barrier material composed a polymer-laminated metal material that is lightweight and flexible. A particularly preferred cell container material is a polymer-laminated aluminum foil, such as the product referred to as Forming Type Laminated Aluminum Foil for Lithium Ion Battery Application available from Showa Aluminum Corporation, Japan (also product number 96031, available from Pharma Center Shelbyville, Inc, of Shelbyville, Ky.). This product is a laminate approximately 120 microns thick composed of a thin (about 45 microns) aluminum foil between polymer film layers of cross-linked polypropylene (about 45 microns) and nylon (about 30 microns). It is cold-formable, chemically resistant to highly polar solvents, seals against ethylene-based materials, and seals to metals such as aluminum, nickel, copper and stainless steel. Further details regarding cells packaged using such a material may be found in U.S. patent application Ser. No. 09/536,225 entitled, FOIL-PACKAGED ELECTROCHEMICAL CAPACITOR CELLS, filed Mar. 27, 2000, the disclosure of which is incorporated by reference herein for all purposes.

In general, leads 208 are connected to the electrodes 202 (via the current collectors 209, if present) and protrude from the package 210 for external electrical connection. Alternatively, the cells may be configured for direct external electrical connection as described in U.S. patent application Ser. No. 09/536,228 entitled STACKABLE ELECTROCHEMICAL CAPACITOR CELLS, filed Mar. 27, 2000, the disclosure of which is incorporated by reference herein for all purposes.

Small and large devices may be fabricated in accordance with the present invention. Multi-layer devices can also be built to either increase voltage (in series configuration) or decrease ESR (in parallel configuration).

In accordance with the present invention, volumetric capacitance levels of 10 to 15 F/cc are believed to be attainable.

Electrochemical structures and cells in accordance with the present invention may be formed by a variety of processes that provide for the formation of a noncontiguous layer of dielectric particles between two electrodes. Such an electrochemical structure may be placed in a cell container, and electrolyte may be provided, either with the dielectric particles or following their application. To complete a cell, the electrode and dielectric layers are laminated and the cell container sealed.

Figure 3A:
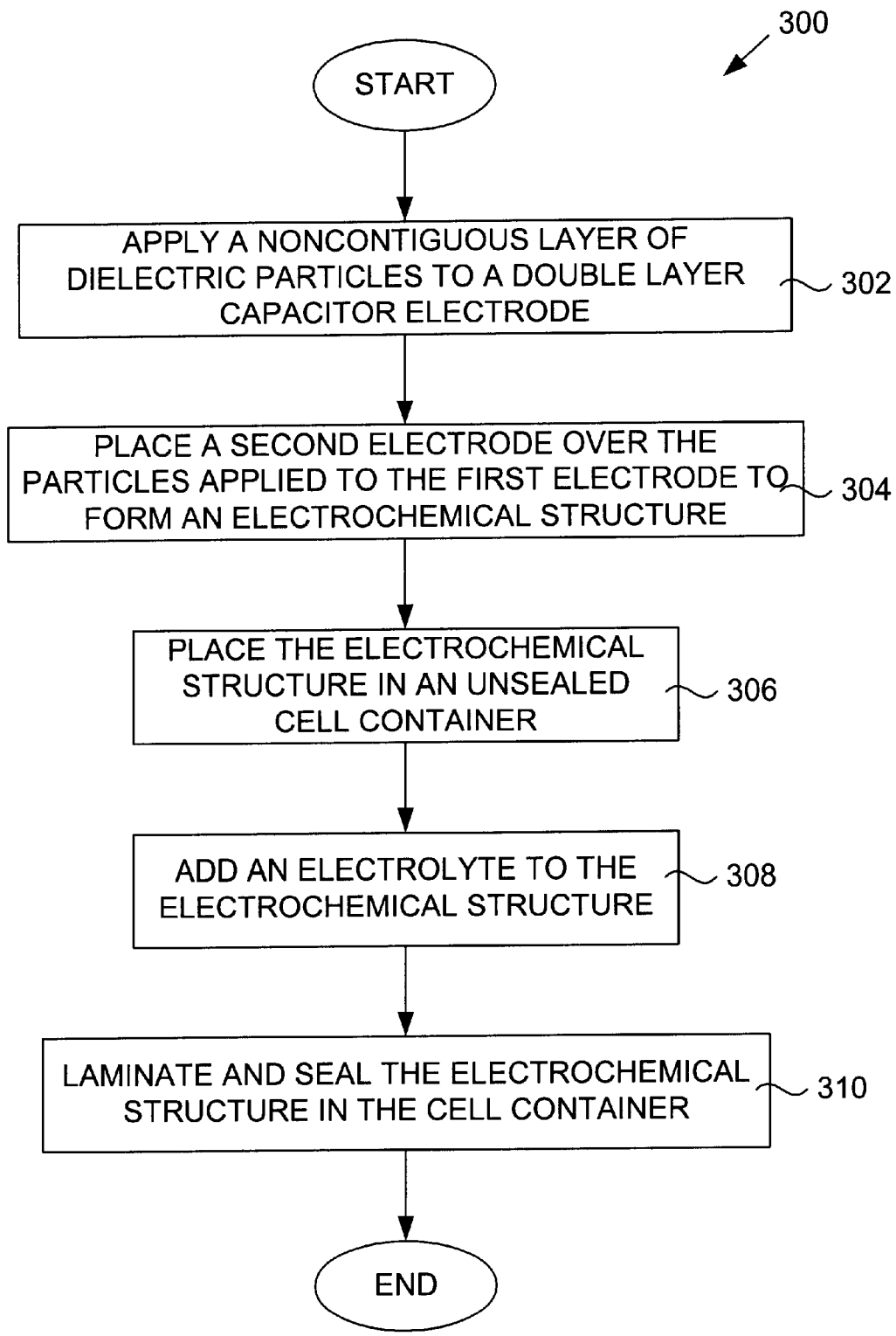
FIGS. 3A and 3B depict flow charts presenting various aspects of the fabrication of separator-less cells according to alternative embodiments of the present invention.

Double layer capacitor cells in accordance with the present invention may be manufactured using methods adapted from the field of field effect devices, in particular liquid crystal displays (LCDs). In one embodiment, depicted in the flow chart 300 of FIG. 3A, a layer of dielectric particles is applied to a double layer capacitor electrode such as described above (302). The dielectric particles may be glass beads having a substantially uniform diameter of about 1 to 10 microns, or 3 to 5 microns, for example about 5 microns. These glass beads may be applied to the capacitor electrode using bead spraying techniques conventional in the fabrication of liquid crystal displays. For example, beads may be sprayed onto the surface, (e.g., dropped down from a container and distributed randomly).

Following application of the beads, a second capacitor electrode is placed upon the beads (304). Beads applied in this manner have a distribution and density sufficient to maintain the uniform separation of the two electrodes. Further layering of electrodes and beads in the same manner may be conducted to provide multi-layered cells of increased capacitance.

The layered electrodes and dielectric may then be placed in an unsealed cell container (packaging) material (306). Suitable cell container materials are described above and may include rigid metals (to form "prismatic" cells) or polymer laminates, such the laminated foil product available from Showa Aluminum Corporation, noted above. Electrolyte, such as described above, may then be injected into the unsealed cell container to fill the space between the electrodes unoccupied by the beads (308). In one embodiment, the unsealed cell containers are placed in a dry environment, for example, less than 5% relative humidity, preferably less than 2% (such an environment may be provided in glove box pressure vessel), and filled with a non-aqueous electrolyte, such as tetraethylammonium tetrafluoroborate ($Et_4N(BF_4)$) salt dissolved in propylene carbonate. Then, the cell container is laminated and sealed, for example, using conventional techniques (310). For example, by heating under pressure to a temperature sufficient to melt the polymer in a laminated foil barrier sheet, for example, a temperature of about 120° C. for the Pharma Center product.

Figure 3B:
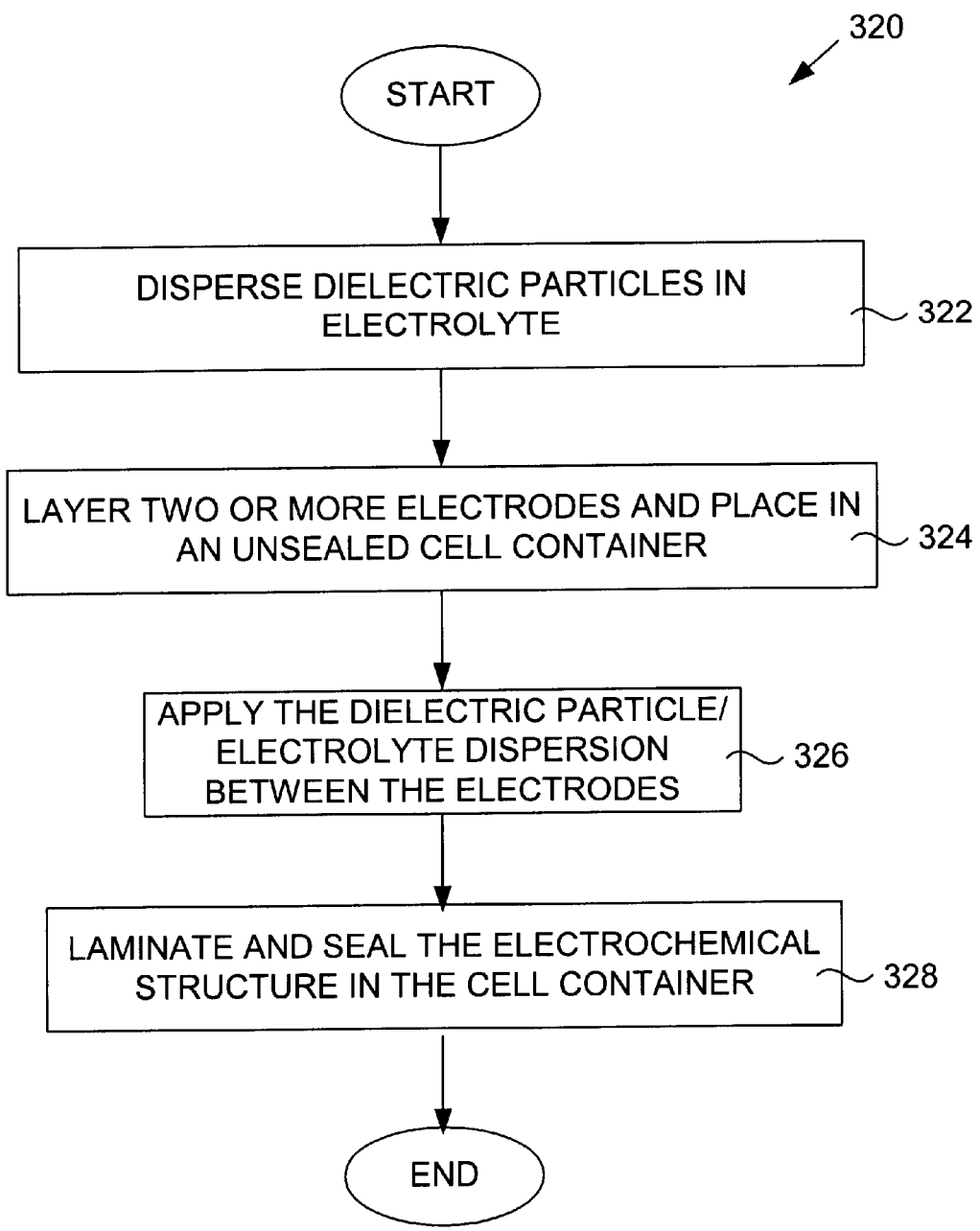

In an alternative embodiment, depicted in the flow chart 320 of FIG. 3B, substantially uniformly sized dielectric particles, such as glass beads having a substantially uniform diameter of about 1 to 10 microns, or 3 to 5 microns, for example about 5 microns, may be dispersed in an electrolyte (322). Two or more electrodes may be layered and placed in an unsealed cell package (324), and the dielectric particle/electrolyte dispersion may be applied between the electrodes, for example by injection according to procedures used in conventional electrochemical cell preparation, to provide a substantially uniform electrolyte permeated dielectric layer between the electrodes (326). For example, 10 to 80% of the volume, preferably 20 to 60%, may be composed of dielectric particles. In a rectangular cell design, three sides of the cell may be sealed with the remaining side left open (otherwise, an opening may be left on the perimeter of non-rectangular (e.g., circular) cells). The unit in vacuum may be slowly dipped into the electrolyte dispersion and pressurized, forcing electrolyte and particles into the cavity between the electrodes. The dry conditions described above may be used in one embodiment in which the non-aqueous electrolyte is composed of tetraethylammonium tetrafluoroborate ($Et_4N(BF_4)$) salt dissolved in propylene carbonate. The cell may then be laminated and sealed, for example using conventional techniques (308).

While the invention has been described above primarily in connection with double layer capacitor cells, it should be noted that it is also applicable to the fabrication of other electrochemical devices, such as batteries and fuel cells. Separator-less electrode and dielectric structures in accordance with the present invention may also be prepared for incorporation into other such electrochemical cells using electrode and electrolyte materials well known in the art.

EXAMPLE

It must be emphasized that the following procedure is a proof of concept for the present invention. This is just one example of an implementation of the present invention and is not intended to limit the scope of the invention. Other techniques and materials can be used in accordance with the general parameters outlined above. Five micron glass fibers were sprinkled onto one of two aerogel carbon disks about 25 mm in diameter. A few drops of organic electrolyte were dispensed on the disk. The second disk was placed over the first disk with fibers and electrolyte sandwiched. The entire assembly was sealed with tape. Gold leaf foil was used to make contact with the carbon disks. The capacitance and impedance were measured to confirm that a functional cell resulted.

Conclusion

The present invention may be applied to produce a low impedance, high performance dielectric between electrochemical device electrodes, in particular in double layer capacitor cells, as well as in other electrical, electronic, and structural applications. Cells in accordance with specific embodiments of the present invention may have higher volumetric capacitance than conventional cells.

Although the foregoing invention has been described in some detail for purposes of clarity of understanding, it will be apparent that certain changes and modifications may be practiced within the scope of the appended claims. It should also be noted that there are may alternative ways of implementing the present invention. Accordingly, the described embodiments are to be considered as illustrative and not restrictive, and the invention is not to be limited to the details given herein.

What is claimed is:

1. An electrochemical cell, comprising:
   a cell container;
   a first electrode provided within the cell container;
   a second electrode provided within the cell container;
   a noncontiguous dielectric provided within the cell container and disposed between the electrodes; and
   an electrolyte provided within the cell container.
2. The electrochemical cell of claim 1, wherein each of said first and second electrodes comprises carbon.
3. The electrochemical cell of claim 2, wherein each of said first and second electrodes further comprises a current collector attached to said carbon.
4. The electrochemical cell of claim 2, wherein said carbon is a carbon aerogel disk.
5. The electrochemical cell of claim 4, wherein said carbon aerogel disk is monolithic.
6. The electrochemical cell of claim 1, wherein said noncontiguous dielectric comprises an array of particles having a substantially uniform diameter.
7. The electrochemical cell of claim 6, wherein said particles are selected from the group consisting of glass beads and glass fibers.
8. The electrochemical cell of claim 7, wherein said particles are glass beads.
9. The electrochemical cell of claim 8, wherein beads have a diameter of about 1 to 10 microns.
10. The electrochemical cell of claim 8, wherein beads have a diameter of about 3 to 5 microns.
11. The electrochemical cell of claim 7, wherein the particles are glass fibers.
12. The electro chemical cell of claim 1, wherein the noncontiguous dielectric occupies between 10% and 80% of the volume between the electrodes.
13. The electrochemical cell of claim 1, wherein said cell container comprises polymer-laminated aluminum foil.
14. The electrochemical cell of claim 1, wherein said electrolyte comprises tetraethylammonium tetrafluoroborate ($Et_4N(BF_4)$) salt dissolved in an organic solvent.
15. The electrochemical cell of claim 1, wherein said cell is a double layer capacitor cell.
16. A double layer capacitor cell, comprising:
   a cell container;
   a first carbon aerogel electrode provided within the cell container;
   a second carbon aerogel electrode provided within the cell container;
   a noncontiguous dielectric comprising glass beads having a substantially uniform diameter of about 3 to 5 microns provided within the cell container and disposed between the electrodes; and
   an electrolyte provided within the cell container.
17. An electrochemical structure, comprising:
   a first carbon aerogel electrode;
   a second carbon aerogel electrode; and
   a noncontiguous dielectric disposed between the electrodes.
18. The structure of claim 17, wherein said noncontiguous dielectric comprises an array of particles having a substantially uniform diameter of about 1 to 10 microns.
19. The structure of claim 18, wherein said particles are glass beads having a diameter of about 4 to 5 microns.
20. The structure of claim 18, wherein the particles are glass fibers.

* * * * *